(12) United States Patent
Paek et al.

(10) Patent No.: US 7,399,420 B2
(45) Date of Patent: Jul. 15, 2008

(54) METHOD OF FABRICATING STAMPER AND FOCUSING GRATING COUPLER USING THE SAME

(75) Inventors: Mun Cheol Paek, Daejeon-Shi (KR); Dong Woo Suh, Daejeon-Shi (KR); Ho Jun Ryu, Seoul (KR); Hyeon Bong Pyo, Daejeon-Shi (KR); Yong Woo Park, Daejeon-Shi (KR)

(73) Assignee: Electronics and Telecommunications Research Institute, Daejeon-Shi (KR)

( * ) Notice: Subject to any disclaimer, the term of this patent is extended or adjusted under 35 U.S.C. 154(b) by 873 days.

(21) Appl. No.: 10/803,921

(22) Filed: Mar. 19, 2004

(65) Prior Publication Data

US 2005/0121415 A1    Jun. 9, 2005

(30) Foreign Application Priority Data

Dec. 5, 2003    (KR) .................. 10-2003-0088261

(51) Int. Cl.
*B29D 11/00*    (2006.01)
*G02B 6/26*    (2006.01)

(52) U.S. Cl. ........................ 216/24; 264/1.25
(58) Field of Classification Search ............ 216/41; 264/1.33; 360/135; 428/64.1, 64, 64.4; 430/321
See application file for complete search history.

(56) References Cited

U.S. PATENT DOCUMENTS

| 4,779,259 | A | 10/1988 | Kono et al. |
| 5,676,854 | A * | 10/1997 | Inui et al. .................. 216/24 |
| 6,285,813 | B1 | 9/2001 | Schultz et al. |

FOREIGN PATENT DOCUMENTS

JP    2000348393 A * 12/2000

OTHER PUBLICATIONS

Shogo Ura, et al.; "*An Integrated-Optic Disc Pickup Device*"; Journal of Lightwave Technology; vol. LT-4, No. 7; Jul. 1986; pp. 913-918.
Stephen Sheard, et al.; "*Focusing waveguide grating coupler using a diffractive doublet*"; Applied Optics; vol. 36, No. 19; Jul. 1, 1997; pp. 4349-4353.

\* cited by examiner

*Primary Examiner*—Roberts Culbert
(74) *Attorney, Agent, or Firm*—Lowe Hauptman Ham & Berner LLP

(57) ABSTRACT

Provided are a stamper fabricated by using an embossing master and a focusing grating coupler fabricated by using the stamper, which is applicable to a subminiature pickup head for a mobile optic disk, whereby it is possible to reduce a weight and a volume of the pickup head with a simple process and low cost and to apply for mass production.

9 Claims, 3 Drawing Sheets

METHOD OF FABRICATING STAMPER AND FOCUSING GRATING COUPLER USING THE SAME

BACKGROUND

1. Field of the Invention

The present invention relates to a method of fabricating a microscopic focusing grating coupler that is applicable to a subminiature pickup head for a mobile optic disk and, more particularly, to a method of fabricating a focusing grating coupler using a stamper manufactured by an embossing master.

2. Discussion of Related Art

In general, an optical pickup head is applied in the field of an optic disk such as CD, DVD, and etc., and composed of an optic lens manufactured by a transparent material such as a glass and a plastic, and a number of components such as a collimator, a beam splitter, a quarter wave plate, tracking/focusing servo-actuator, a laser diode, photo diodes and etc. Thus, the pickup head of a prior art has disadvantages in view of an access time and a data transfer rate, as compared with a magnetic disk, since it has a large volume and a heavy weight.

As a mass data storage device for a portable information appliance, a subminiature optic disk driver has been studied, as information and communication technology has been developed. Therefore, it is required a new technology that can improve demerits of the conventional pickup head.

As a technology for reducing a size and a weight of the pickup head remarkably, a method for using a focusing grating coupler composed of an optic grating has been proposed, instead of using an objective lens. The focusing grating coupler is comprised of an ultra fine grating that is finer than a wavelength of light, and focuses a laser light to one point, whereby it is possible to reduce a size of a core part in the pickup head to a semiconductor chip size or less, and to improve an access time and a data transfer rate. The focusing grating coupler employs a principle that a laser light incident on a planar waveguide is focused by using a diffractive grating. It could be fabricated in a very small size and serve as an objective lens.

For increasing a recording density of the pickup head, the laser light focused on the focusing grating coupler should have a minimum spot size, and a numerical aperture (NA) of the lens should be increased since the laser light source is fixed. Thus, in the case of using the technology described above, it is possible to increase a lens size to a constant focal length, i.e. a coupling area, or increase a coupling angle. At this time, a minimum space between grating patterns should be maintained 100 nm or less corresponding to a value smaller than a quarter wavelength of the laser light source. Thus, it is required an expensive equipment such as an electron beam lithography system (EBLS) and a high process technology, and needs time and cost-consuming fabrication processes.

SUMMARY OF THE INVENTION

The present invention is directed to a method of manufacturing a stamper and a method of manufacturing a focusing grating coupler using the same, in which the aforementioned problems are resolved by fabricating a stamper using an embossing master produced by the EBLS, and manufacturing a focusing grating coupler in a grating layer using the stamper by means of pressing and anisotropic etching processes.

One aspect of the present invention is to provide a method of manufacturing a stamper for a focusing grating coupler, comprising the steps of: forming a predetermined grating pattern of a metallic thin layer on a substrate; forming a negative pattern having an inverse image to the grating pattern by etching an exposed part of the substrate with a predetermined depth; completing an embossing master having the negative pattern thereon, by removing the metallic layer; forming an anti-adhesion layer on a whole surfaces of the embossing master; forming a stamper layer with a predetermined thickness on the anti-adhesion layer so that the negative pattern is completely buried; and completing a stamper by separating the stamper layer from the embossing master, the stamper having a grating pattern of an inverse image to the negative pattern thereon.

Here, the substrate is etched by a thickness of a focusing grating coupler to be formed, in order to form the negative pattern. The anti-adhesion layer is formed with a metal. And, the stamper layer is formed with a metal or a polymer.

Another aspect of the present invention is to provide a method of manufacturing a focusing grating coupler using a stamper, comprising the steps of: sequentially forming a clad buffer layer, a core layer, a grating layer, and a polymer layer; disposing a stamper on the polymer layer, the stamper being fabricated according to a preferred embodiment of the present invention; forming a grating pattern having an inverse image to a grating pattern of the stamper, by pressing the stamper in the polymer layer; removing the stamper; and forming a focusing grating coupler composed of the grating layer on the core layer, by anisotropically etching the polymer layer and the grating layer.

Here, the clad buffer layer is a silica thin film, and formed with a thickness of 5 to 10 μm. The core layer is formed with a material having a higher refractive index than that of the clad buffer layer. The grating layer is formed with a material having a higher refractive index than that of the core layer. And, the grating layer is a silicon nitride film. In addition, when pressing the stamper in the polymer layer, heat or ultra violet is irradiated.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1A:
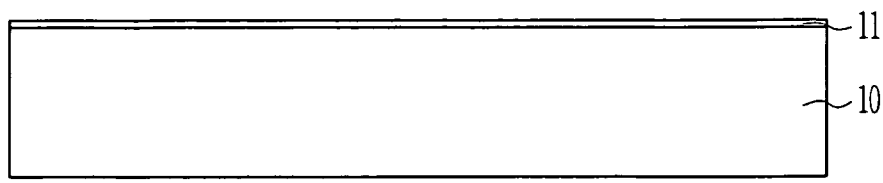
FIGS. 1A to 1F are cross sectional views for explaining a method of manufacturing an embossing master and a stamper for fabricating a microscopic focusing grating coupler, according to a preferred embodiment of the present invention.

The present invention will be described in detail by way of the preferred embodiment with reference to the accompanying drawings, in which like reference numerals are used to identify the same or similar parts.

In the present invention, a focusing grating coupler having a line width of 100 nm or less may be manufactured without using complex processes such as a formation of a electroresist film, an exposure of an electron beam, a development, an etching, and so on. An embossing master is fabricated by means of an EBLS in accordance with a drawing designed to have a proper focusing distance and numerical aperture, and a stamper of an inverse replica is manufactured by using the embossing master. In addition, a focusing grating coupler is manufactured in a silicon nitride film by means of pressing and etching processes using the stamper. The stamper can be used repeatedly and continuously, and reproduced by the embossing master even though its life is over.

Hereinafter, a preferred embodiment of the present invention will be explained with reference to the drawings.

FIGS. 1A to 1F are cross sectional views for explaining a method of manufacturing an embossing master and a stamper for fabricating a microscopic focusing grating coupler, according to a preferred embodiment of the present invention.

Referring to FIG. 1A, as a substrate for forming an embossing master, a quartz substrate 10 coated with a metallic thin film 11 for high precision may be used.

Figure 1B:
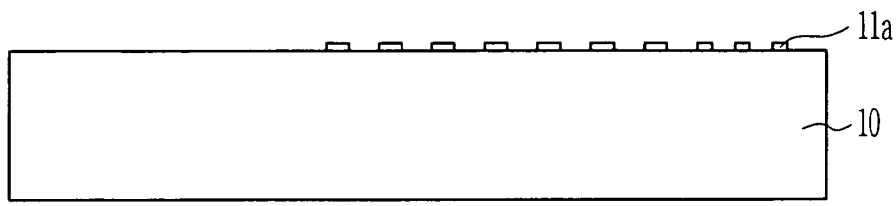

Referring to FIG. 1B, the metallic thin film 11 is patterned to form a metallic grating pattern 11a by means of a lithography and an etching process using the EBLS or a predetermined mask.

Figure 1C:
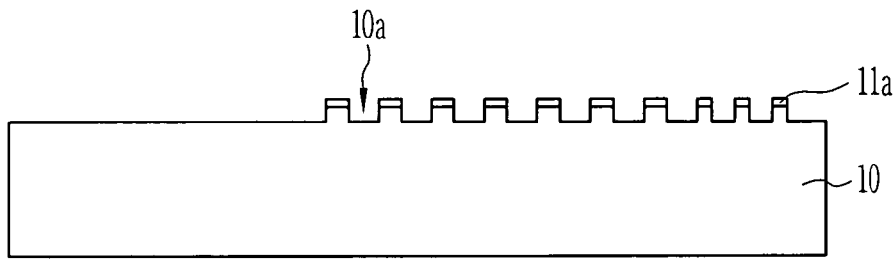

Referring to FIG. 1C, an exposed part of the quartz substrate 10 is etched to form a negative pattern 10a by means of an etching process using the metallic pattern 11a as a mask. The negative pattern 10a has an inverse image to the metallic pattern 11a, and is formed with a negative type in the quartz substrate 10. At this time, a depth of the negative pattern corresponding to a thickness of the focusing grating coupler can be adjusted accurately by etching time.

Figure 1D:
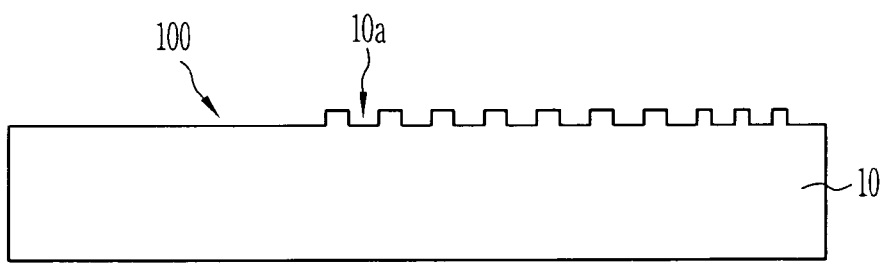

Referring to FIG. 1D, an embossing master 100 composed of the quartz substrate 10, on which the negative pattern 10a is formed, is completed when the metallic pattern 11a is removed.

Figure 1E:
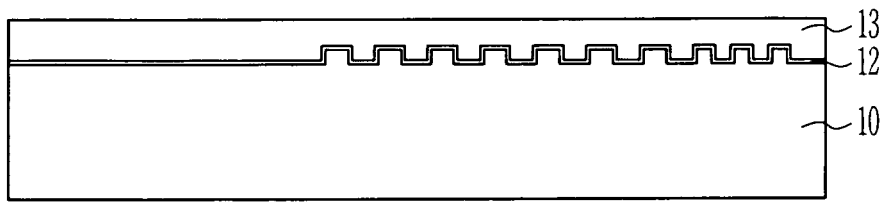

Referring to FIG. 1E, an anti-adhesion layer 12 is formed all over the embossing master 100 with a metal, in order to fabricate a stamper for reproducing a pattern from the embossing master 100. And, a stamper layer 13 having a thickness of hundreds of micrometers or more is formed on the anti-adhesion layer 12 so that the negative pattern 10a is completely buried while planarizing the surface. The stamper layer 13 may be formed with a metal such as a nickel or a polymer.

Figure 1F:
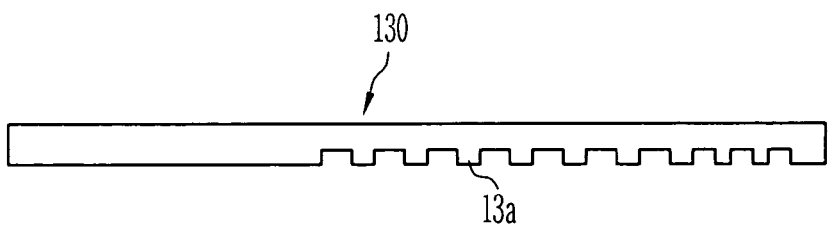

Referring to FIG. 1F, if the stamper layer 13 is separated from the embossing master 100, a stamper 130 is produced, on which the negative pattern 10a and the grating pattern 13a having the inverse image are formed.

Preferably, the stamper 130 may be produced with a sufficient thickness for convenience in handling. In addition, the stamper 130 can be reproduced by the method as described above using the embossing master 100, when its life is over.

FIGS. 2A to 2H are cross sectional views for explaining a method of manufacturing a focusing grating coupler by using the resultant stamper 130, according to a preferred embodiment of the present invention.

Figure 2A:
FIGS. 2A to 2H are cross sectional views for explaining a method of manufacturing a focusing grating coupler according to a preferred embodiment of the present invention.

Referring to FIG. 2A, a substrate 20 for manufacturing a focusing grating coupler may be a silicon wafer or a quartz glass wafer.

Figure 2B:
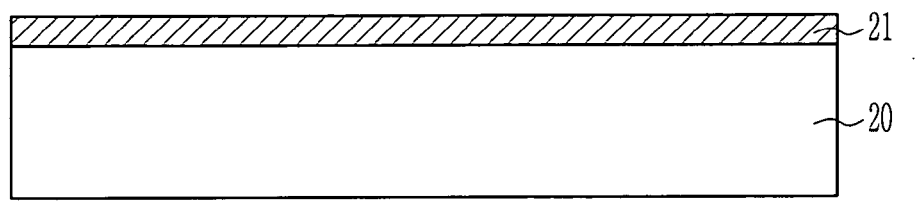

Referring to FIG. 2B, a clad buffer layer 21 is formed on the substrate 20 with a silica thin film, which is designed to have a refractive index contrast smaller than that of a waveguide layer, so as to maintain a single mode of a laser. The clad buffer layer 21 may have a thickness of 5 to 10 μm.

Figure 2C:
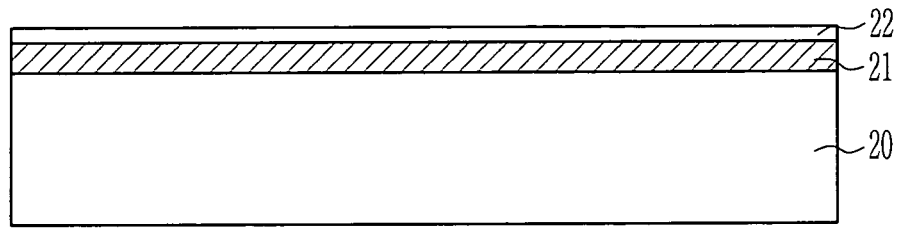

Referring to FIG. 2C, a core layer 22 having a higher refractive index than that of the clad buffer layer 21 is formed on the clad buffer layer 21 to maintain a single mode of a laser. The core layer 22 may be formed with a thickness of about 2 μm.

Figure 2D:
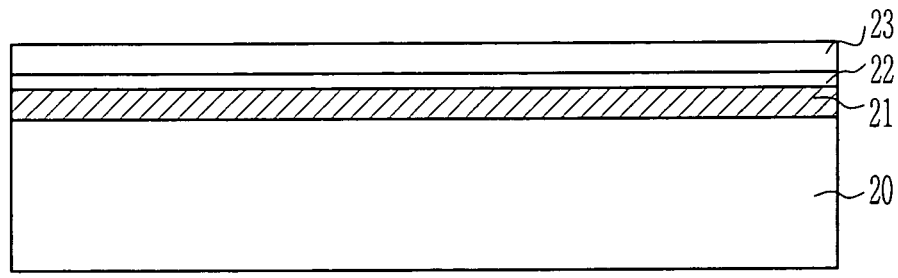

Referring to FIG. 2D, a transparent material such as a silicon nitride film 23 having a higher refractive index than that of the core layer 22 is formed on the core layer 23. The silicon nitride film 23 is contacted with the core layer 22 and serves as a grating of the focusing grating coupler.

Figure 2E:
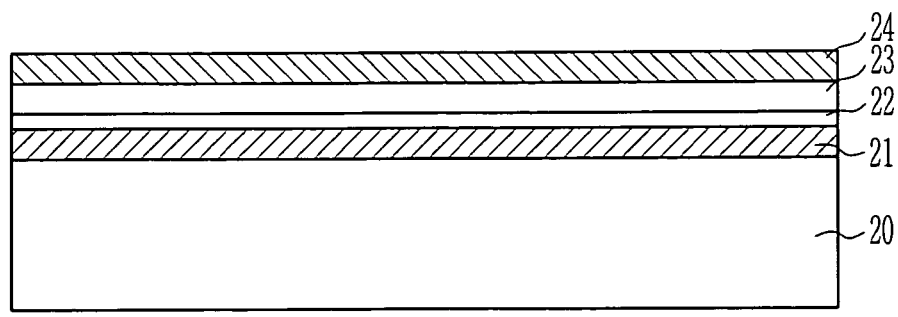

Referring to FIG. 2E, a polymer layer 24 having a superior formability is formed on the silicon nitride film 23. Preferably, the polymer layer 24 has a sufficient formability and hardness, at the same time.

Figure 2F:
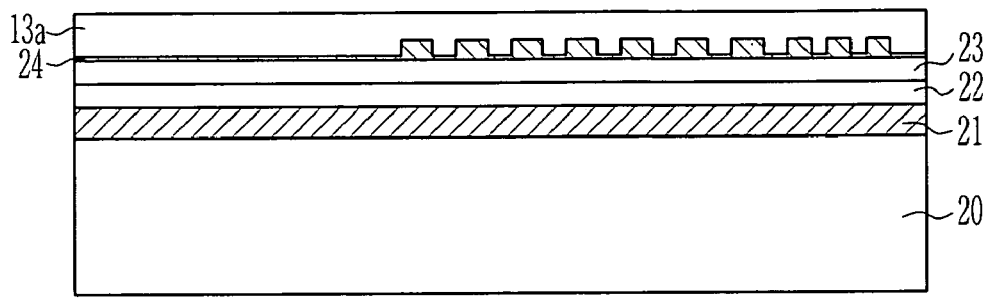

Referring to FIG. 2F, the stamper 130 as shown in FIG. 1F is disposed on the polymer layer 24. The stamper 130 is pressed in the polymer layer 24 to form a grating pattern 24a on the polymer layer 24. At this time, if a pressure is applied to the stamper 130 with irradiation of heat or ultra violet, the grating pattern 24a having an inverse image to the grating pattern 13a of the stamper 130 is formed on the polymer layer 24.

Figure 2G:
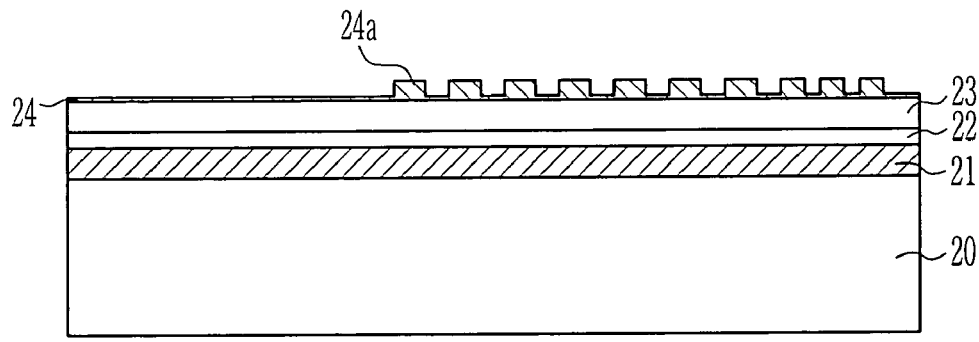
Figure 2H:
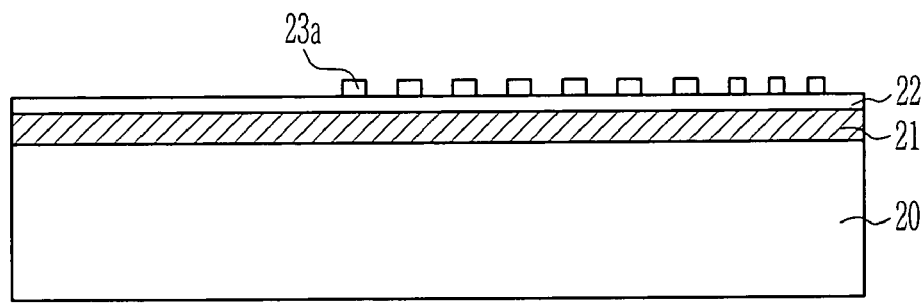

Referring to FIG. 2G, the stamper 130 is removed, and then, the polymer layer 24 and the silicon nitride film 23 are dry etched anisotropically and vertically until the core layer 22 is exposed. As the etching time goes by, the polymer layer 24 is removed and the silicon nitride film 23 is exposed. And, the exposed part of the silicon nitride film 23 is etched vertically and the core layer 22 is exposed. If the etching process is stopped at the time of the core layer 22 being exposed, the focusing grating coupler 23a composed of the silicon nitride film 23 is formed on the core layer 22 as shown in FIG. 2H. At this time, the dry etching time could be controlled according to the thickness of the grating pattern 24a reproduced in the polymer layer 24.

As described above, the present invention provides a microscopic focusing grating coupler that can be employed instead of an objective lens, which is a core component for a pickup module of a subminiature optic disk. In a prior art, an expensive EBLS and a high technology for forming a nano pattern have been required to form an ultra fine pattern having a line width of 100 nm or less. However, according to the present invention, an embossing master is fabricated by using the EBLS, and a stamper of an inverse replica is manufactured by using the embossing master. In addition, a focusing grating coupler is manufactured in a silicon nitride film by means of pressing and anisotropic etching processes using the stamper. Therefore, it is possible to reduce a weight and a volume of the pickup head with a simple process and low cost and to apply for mass production. And, the focusing grating coupler can be manufactured with a semiconductor chip size.

In addition, an objective lens can be implanted with a subminiature size, a light weight, and a high performance. Here, the objective lens is one of the core components in a mobile optical storage device drive, i.e. an optic disk having a coin size, which is expected to form a big market in the future. Further, it can be mass-produced with low costs.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A method of manufacturing a focusing grating coupler using a stamper, comprising the steps of:

sequentially forming a clad buffer layer, a core layer, a grating layer, and a polymer layer;

disposing a stamper on the polymer layer, the stamper having a negative pattern thereon;

forming a grating pattern having an inverse image to a grating pattern of the stamper, by pressing the stamper in the polymer layer;

removing the stamper; and forming a focusing grating coupler composed of the grating layer on the core layer, by anisotropically etching the polymer layer and the grating layer, wherein the stamper is fabricated by the steps of:

forming a predetermined grating pattern of a metallic thin layer on a substrate;

forming a negative pattern having an inverse image to the grating pattern, by etching an exposed part of the substrate with a predetermined depth;

completing a metallic pattern master having the negative pattern thereon, by removing the metallic pattern;

forming an anti-adhesion layer on a whole surfaces of the embossing master;

forming a stamper layer with a predetermined thickness on the anti-adhesion layer so that the negative pattern is completely buried; and completing a stamper by separating the stamper layer from the embossing master, the stamper having a grating pattern of an inverse image to the negative pattern thereon.

2. The method as claimed of claim 1, wherein the substrate is etched by a thickness of a focusing grating coupler to be formed, in order to form the negative pattern.

3. The method as claimed of claim 1, wherein the anti-adhesion layer is formed with a metal.

4. The method as claimed of claim 1, wherein the stamper layer is formed with a metal or a polymer.

5. The method as claimed of claim 1, wherein the clad buffer layer is a silica thin film, and formed with a thickness of 5 to 10 μm.

6. The method as claimed of claim 1, wherein the core layer is formed with a material having a higher refractive index than that of the clad buffer layer.

7. The method as claimed of claim 1, wherein the grating layer is formed with a material having a higher refractive index than that of the core layer.

8. The method as claimed of claim 1, wherein the grating layer is a silicon nitride film.

9. The method as claimed of claim 1, when pressing the stamper in the polymer layer, heat or ultra violet is irradiated.

* * * * *